UNITED STATES PATENT OFFICE.

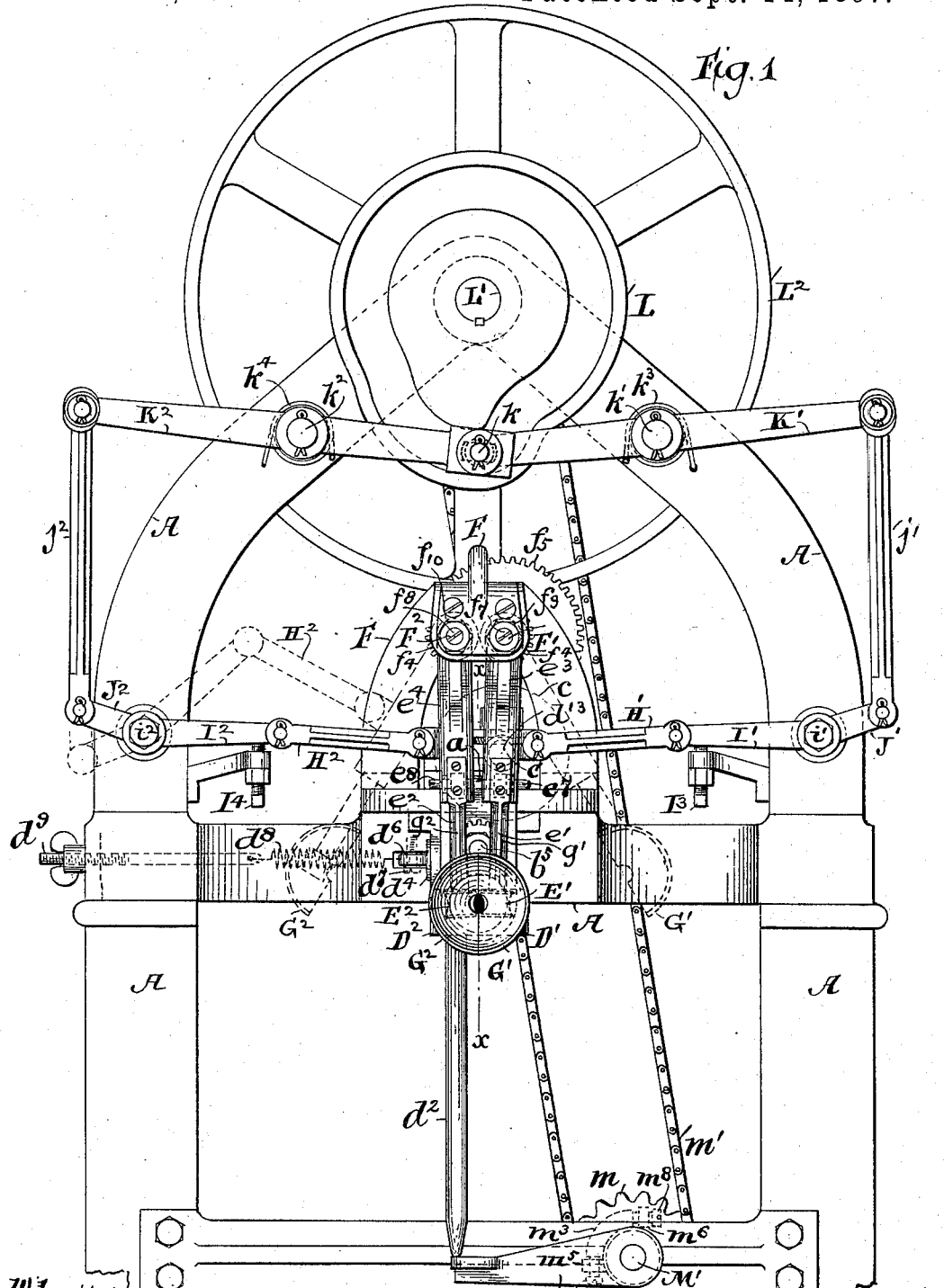

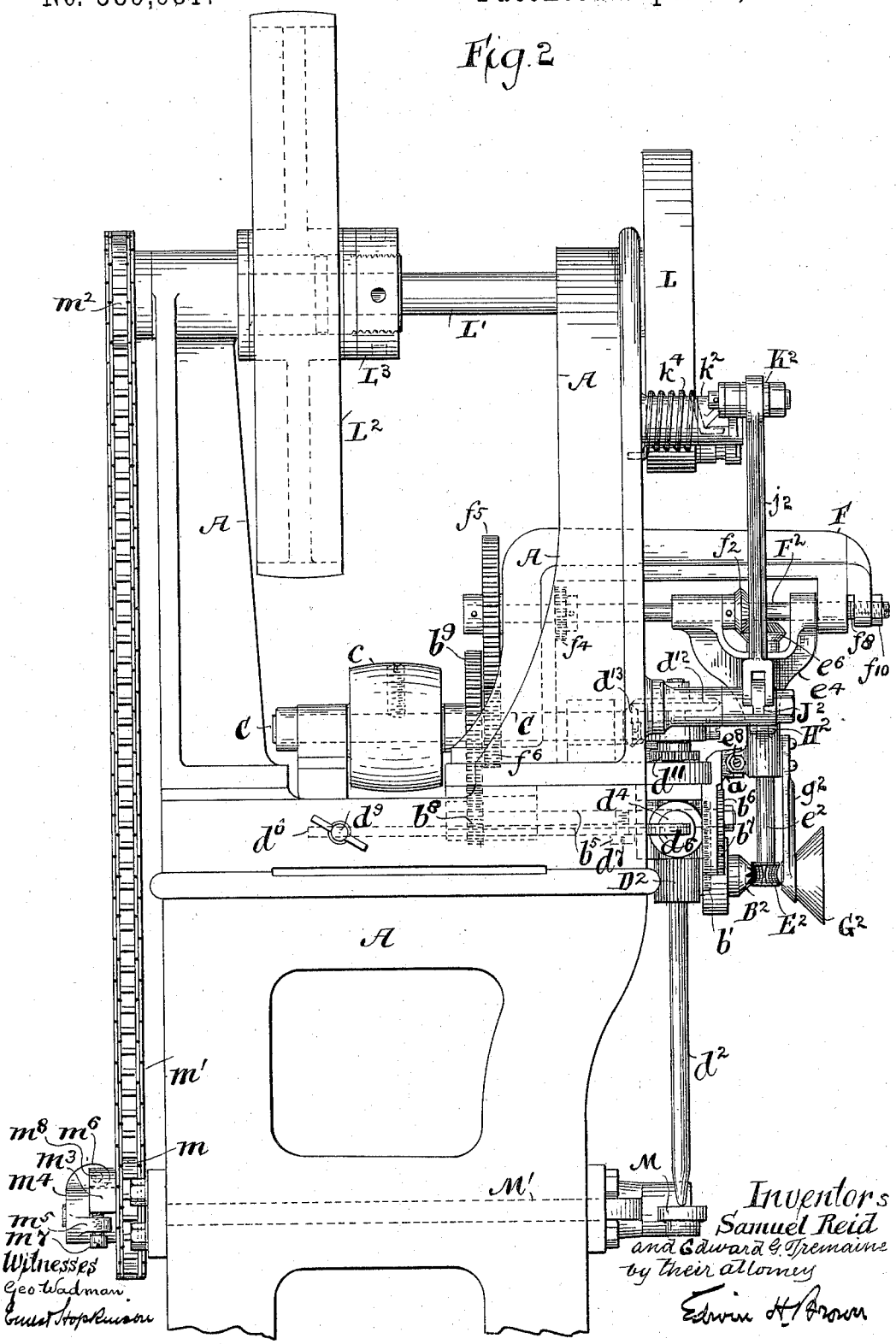

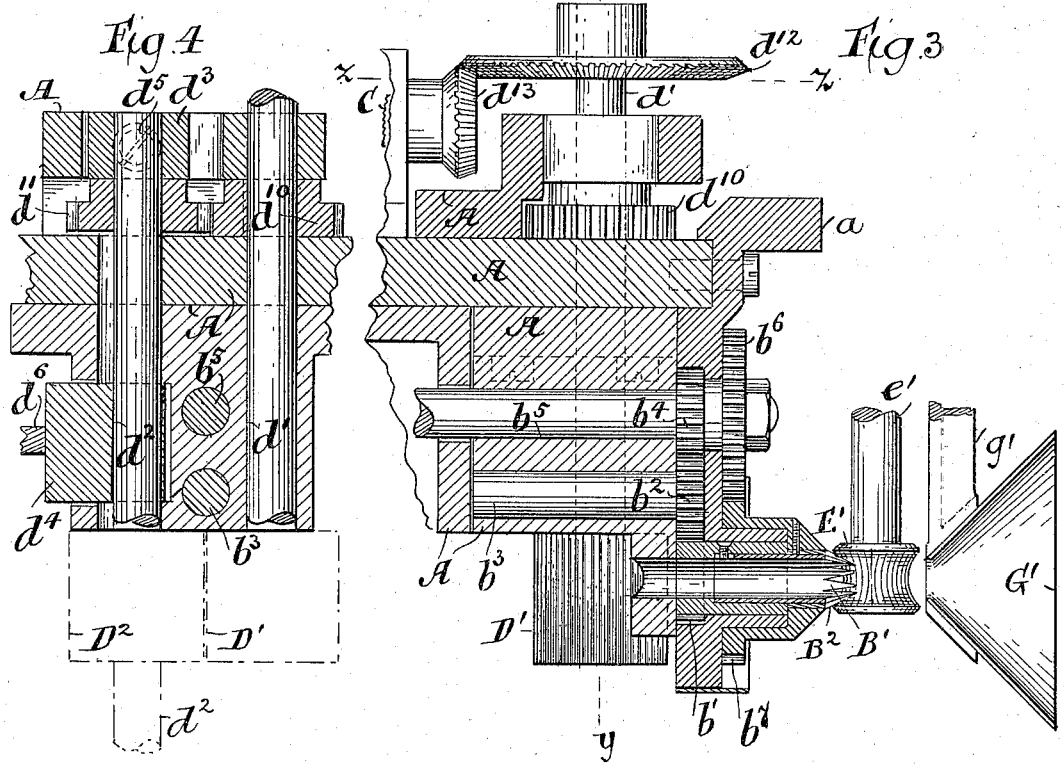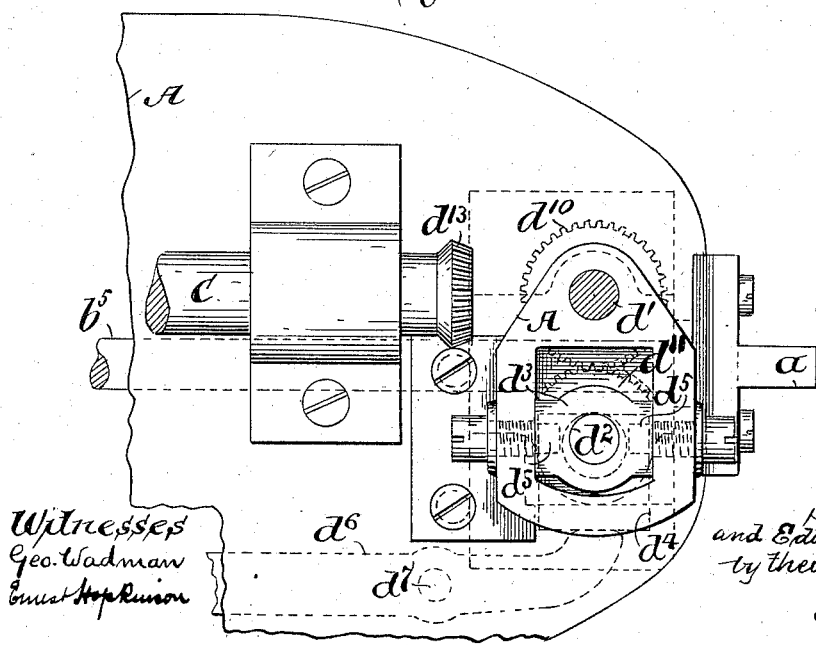

SAMUEL REID, OF JERSEY CITY, NEW JERSEY, AND EDWARD G. TREMAINE, OF BROOKLYN, NEW YORK, ASSIGNORS TO THE REID TOBACCO MACHINERY COMPANY, OF NEW YORK, N. Y.

MACHINE FOR STRIPPING OR STEMMING TOBACCO-LEAVES.

SPECIFICATION forming part of Letters Patent No. 589,981, dated September 14, 1897.

Application filed June 17, 1896. Serial No. 595,865. (No model.)

*To all whom it may concern:*

Be it known that we, SAMUEL REID, of Jersey City, in the State of New Jersey, and EDWARD G. TREMAINE, of Brooklyn, in the State of New York, have invented a certain new and useful Improvement in Machines for Stripping or Stemming Tobacco-Leaves, of which the following is a specification.

We will describe a machine embodying our improvement, and afterward point out the novel features in the claims.

In the accompanying drawings, Figure 1 is a front elevation of a machine embodying our improvement. Fig. 2 is a side view of the same. Fig. 3 is a vertical section taken at the plane of the line $x\,x$, Fig. 1. Fig. 4 is a vertical section taken at the plane of the dotted line $y\,y$, Fig. 3. Fig. 5 is a sectional top view taken at the plane of the dotted line $z\,z$, Fig. 3.

Similar letters of reference designate corresponding parts in all the figures.

The framework A of the machine may be of any suitable construction and material. The machine comprises tubular cutters $B'\,B^2$, having sharpened and serrated outer ends and fitted together concentrically, so that one closely surrounds the other. The inner cutter $B'$ has affixed to it a gear-wheel $b'$, which meshes with a gear-wheel $b^2$ on a shaft $b^3$ mounted in the framework of the machine. The gear-wheel $b^2$ engages with a gear-wheel $b^4$, affixed to a shaft $b^5$, mounted in the framework of the machine. On the shaft $b^5$ is affixed a gear-wheel $b^6$, which meshes with a gear-wheel $b^7$, that is affixed to the outer cutter $B^2$. Thus the two cutters will be driven in reverse directions.

The shaft $b^5$ has affixed to it a gear-wheel $b^8$, which meshes with a gear-wheel $b^9$, affixed to a shaft C, constituting the driving-shaft of the machine and provided with a belt-pulley $c$.

Tobacco-leaves to be stemmed are subjected to the cutters by introducing the ends of their stems, one at a time, into the inner cutter $B'$ and then causing the leaves to move lengthwise of the cutters. This movement is produced by the hand of the attendant until the end of a stem reaches feed-rollers $D'\,D^2$, which preferably are serrated, so that they may take a firm hold upon the stems.

The feed-rollers $D'\,D^2$ are mounted upon shafts $d'\,d^2$. As shown, the shaft $d'$ is journaled in stationary bearings in the framework of the machine, but the shaft $d^2$ is journaled in movable bearings $d^3\,d^4$. The bearing $d^3$, which supports that end of the shaft which is farthest from the feed-roller $D^2$, is connected by trunnions $d^5$ to the framework of the machine. Hence it can have a swinging movement. The bearing $d^4$ is capable of a sliding movement to adjust the feed-roller $D^2$ relatively to the feed-roller $D'$, for the purpose of causing the feed-rollers to grip with any desired force the stem of the tobacco-leaf, which they are to feed. The bearing $d^4$ is actuated by means of a lever $d^6$, which is fulcrumed at $d^7$ to the framework of the machine and connected beyond the fulcrum with a spring $d^8$. With the spring $d^8$ is combined an adjustable screw $d^9$, connected with the framework of the machine, so as to be capable of varying the tension of the spring and hence the force with which the feed-roller $D^2$ will be impelled toward the feed-roller $D'$.

On the shafts $d'\,d^2$ of the feed-rollers $D'\,D^2$ are fixed gear-wheels $d^{10}\,d^{11}$. Hence the two feed-rollers will rotate in unison and in opposite directions. On the shaft $d'$ is fixed a large beveled gear $d^{12}$, that engages with a smaller beveled gear $d^{13}$, affixed to the driving-shaft C.

In front of the cutters $B'\,B^2$ are rollers $E'\,E^2$, which are affixed to vertical shafts $e'\,e^2$. Preferably these rollers are grooved peripherally, so that when they are in close proximity to each other there will be a circular or approximately circular space between them. The shafts $e'\,e^2$ are journaled in bearings made in the form of brackets, which are supported by the framework A of the machine, which are loosely hung upon shafts $F'\,F^2$, these shafts being supported in a bracket F, that is fastened to the framework A of the machine and extends forwardly therefrom. Therefore the shafts $e'\,e^2$ can swing toward and from each other upon the shafts $F'\,F^2$, as fulcrumed on the shafts F' F² are beveled gear-wheels $e^5 e^6$. These engage with beveled gear-wheels $f' f^2$, affixed to the shafts F' F². The shafts F' F² have affixed to them intermeshing gear-wheels $f^3 f^4$. Hence these shafts rotate in unison. On the shaft F' is affixed a gear-wheel $f^5$, that engages with a gear-wheel $f^6$, affixed to the driving-shaft C.

The shafts F' F² at the forward ends abut against screws $f^7$, which engage with tapped holes in the outer extremities of the bracket F and are combined with jam-nuts $f^9 f^{10}$. By turning these screws the shafts may be adjusted forward and backward to a slight extent to secure exactly the proper relation of the rollers E' E² and cutters B' B². To prevent the rollers E' E² from being moved into too close relation to each other, I provide the brackets $e^3 e^4$ with set-screws $e^7 e^8$ and arrange upon the forward part of the framework A a bracket $a$, the latter being of such length as to project between the set-screws.

Attached to the brackets $e^3 e^4$ are guides G' G² of semiconical shape provided with shanks $g' g^2$, by means of which the connection is made with the said brackets $e^3 e^4$.

The rollers E' E² and the guides G' G² are moved toward and from each other for each leaf that is to be stemmed.

The brackets $e^3 e^4$ are pivotally connected between their ends with rods H' H², which are also pivotally connected with arms I' I², affixed to shafts $i' i^2$, that are journaled in the framework A of the machine. These shafts have also affixed to them arms J' J², and hence said shafts with their arms I' I² and J' J² constitute levers. The arms J' J² are connected by means of rods $j' j^2$ with levers K' K², which are fulcrumed on pins or studs $k' k^2$, supported by the framework A of the machine. The inner ends of these levers K' K² are connected together by means of a pin $k$, which passes transversely through holes with which they are provided, one of the holes being large enough to prevent the pin from interfering with the swing of the levers. The pin $k$ is provided with an anti-friction-roller that fits the groove of a cam L.

With the levers K' K² are combined springs $k^3 k^4$, which may hold the inner ends of the levers K' K² in contact with the inner wall of the cam-groove in the event of any lost motion between the two walls of the groove and the roller. The stops I³ I⁴ are combined with the arms I' I² to limit their downward motion and therefore to limit the movement of said arms I' I². The stops I³ I⁴, as shown, consist of screws which are adjustable in brackets extending from the framework A of the machine.

The cam L is affixed to a shaft L', which is journaled in the framework A of the machine and is provided with a belt-pulley L², by which motion may be imparted to it. It is intended that this belt-pulley shall be constantly driven, but that the shaft L' shall only be driven intermittingly. Hence the pulley L² is mounted loosely upon the shaft L' and connected to it by a friction-clutch L³, which may be of any suitable construction.

The shaft $d^2$, supporting the feed-roller D², extends downwardly and contacts with an arm M, affixed to a rotary shaft M', which has affixed to it a sprocket-wheel $m$, that engages with a chain $m'$, also passing around a sprocket-wheel $m^2$, affixed to the shaft L'. Preferably there will be an adjustment between the arm M and the sprocket-wheel $m$, so that they may be combined in exactly the desired relation. To this end the sprocket-wheel is loosely mounted upon the shaft M', and is provided with a segment $m^3$. Affixed to the shaft adjacent to the sprocket-wheel is a collar $m^4$, having two lugs $m^5 m^6$, extending adjacent to the ends of the segment $m^3$ of the sprocket-wheel. These lugs $m^5 m^6$ of the collar $m^4$ are provided with set-screws $m^7 m^8$, which may be adjusted to impinge against the ends of the said segment. Obviously by manipulations of these set-screws the relation of the sprocket-wheel to the shaft M', and hence its relation to the arm M, may be varied.

As soon as the stem of a tobacco-leaf has been introduced between the guides G' G² it will be grasped by the rollers E' E² and moved through the cutters B' B² to the feed-rollers D' D². Its passage between the latter will cause the feed-roller D² to be moved away from its fellow. Thus the shaft $d^2$ will be moved beyond the arm M. Thereupon the pulley L² will impart through the friction-clutch L³ rotary motion to the shaft L' and the latter will transmit this motion to the shaft M', so as to revolve the arm M. The cam L will also be turned at this time. Hence the guides G' G² and the rollers E' E² will be moved apart so as not to interfere with the tobacco-leaf. The revolution of the arm M will afford time for the stripping or stemming of a leaf. After the passage of the stem of the leaf beyond the rollers D' D² the shaft $d^2$ will be in position to stop the arm M with the guides G' G² and rollers E' E² in proper relation to introduce another leaf.

Suitable receptacles may be provided for the leaves and the stems after stripping or stemming.

What we claim as our invention, and desire to secure by Letters Patent, is—

1. In a tobacco stripping or stemming machine, the combination of tubular concentric cutters, guides for directing a leaf to the same, and feeding means controlled by the stem of the leaf for automatically moving said guides toward and from each other, substantially as specified.

2. In a tobacco stripping or stemming machine, the combination of tubular concentric cutters, guides for directing a leaf to the same, a pair of feed-rollers controlled by the stem of the leaf, and connections between the guides and feed-rollers for moving said guides toward and from each other, substantially as specified.

3. In a tobacco stripping or stemming machine, the combination of tubular concentric cutters, guides for directing a leaf to the same, a roller bodily movable by the stem of the leaf, a surface coacting with the roller and between which and the roller the stem is fed, and connections between said guides and roller for moving the guides toward and from each other, substantially as specified.

4. In a tobacco stripping or stemming machine, the combination of tubular concentric cutters, guides for directing a leaf to the same, means for moving said guides toward and from each other, comprising a constantly-driven shaft, a cam frictionally clutched to said shaft, a stop connected to said cam and determining its time of motion, a roller moved by the stem of a leaf to release said stop, and a surface coacting with said roller and between which and the roller the stem is fed, substantially as specified.

In testimony whereof we have signed our names to this specification in the presence of two subscribing witnesses.

SAMUEL REID.
   EDWARD G. TREMAINE.

Witnesses:
 JOHN J. SKIDMORE,
 WILLIAM J. MERITY.